June 28, 1960 F. D. LEWIS 2,943,277
APPARATUS FOR PRODUCING VARIABLE TIME DELAY
Filed June 18, 1956 8 Sheets-Sheet 1

INVENTOR.
FRANK D. LEWIS
BY Rines and Rines
ATTORNEYS

June 28, 1960 F. D. LEWIS 2,943,277
APPARATUS FOR PRODUCING VARIABLE TIME DELAY
Filed June 18, 1956 8 Sheets-Sheet 2
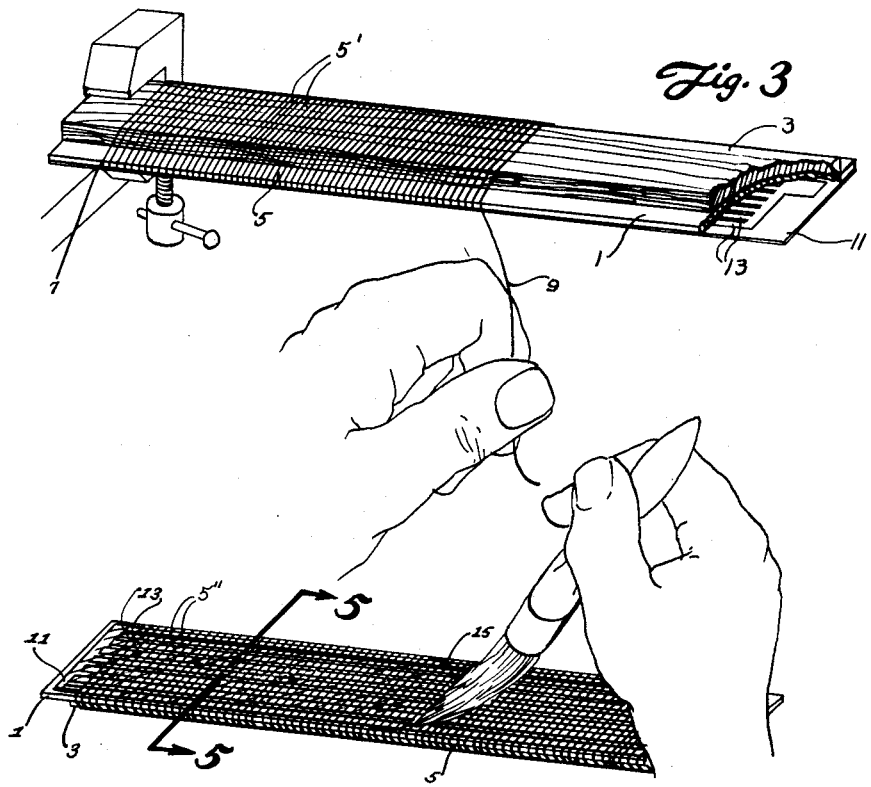
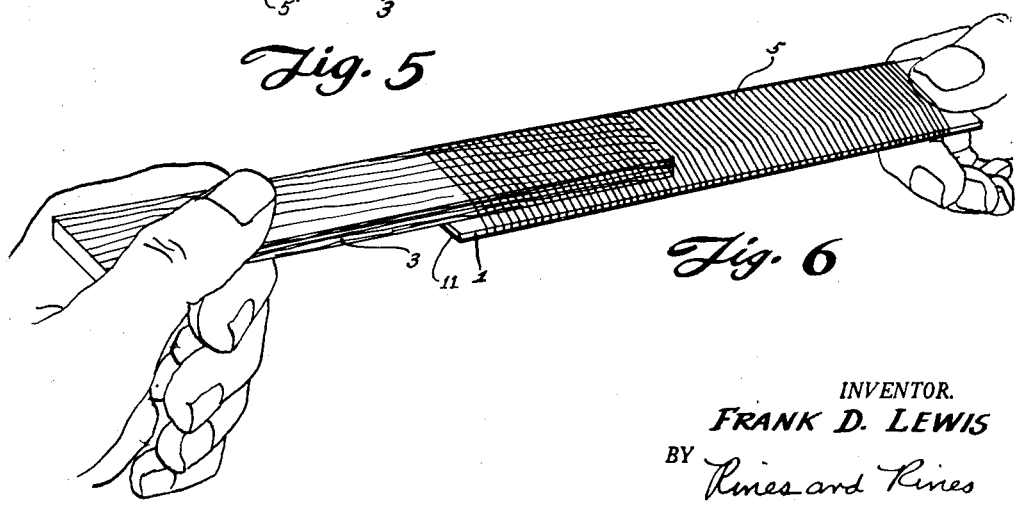
INVENTOR.
FRANK D. LEWIS
BY Rines and Rines
ATTORNEYS INVENTOR.
FRANK D. LEWIS
BY Rines and Rines
ATTORNEYS June 28, 1960 F. D. LEWIS 2,943,277
APPARATUS FOR PRODUCING VARIABLE TIME DELAY
Filed June 18, 1956 8 Sheets-Sheet 4

INVENTOR.
FRANK D. LEWIS
BY Rines and Rines
ATTORNEYS

June 28, 1960  F. D. LEWIS  2,943,277
APPARATUS FOR PRODUCING VARIABLE TIME DELAY
Filed June 18, 1956  8 Sheets-Sheet 5

INVENTOR
FRANK D. LEWIS
BY Rines and Rines
ATTORNEYS

June 28, 1960　　　F. D. LEWIS　　　2,943,277
APPARATUS FOR PRODUCING VARIABLE TIME DELAY
Filed June 18, 1956　　　　　　　　　　　　　8 Sheets-Sheet 6

INVENTOR.
FRANK D. LEWIS
BY Rines and Rines
ATTORNEYS

June 28, 1960

F. D. LEWIS 2,943,277

APPARATUS FOR PRODUCING VARIABLE TIME DELAY

Filed June 18, 1956

INVENTOR.
FRANK D. LEWIS
BY Rines and Rines
ATTORNEYS

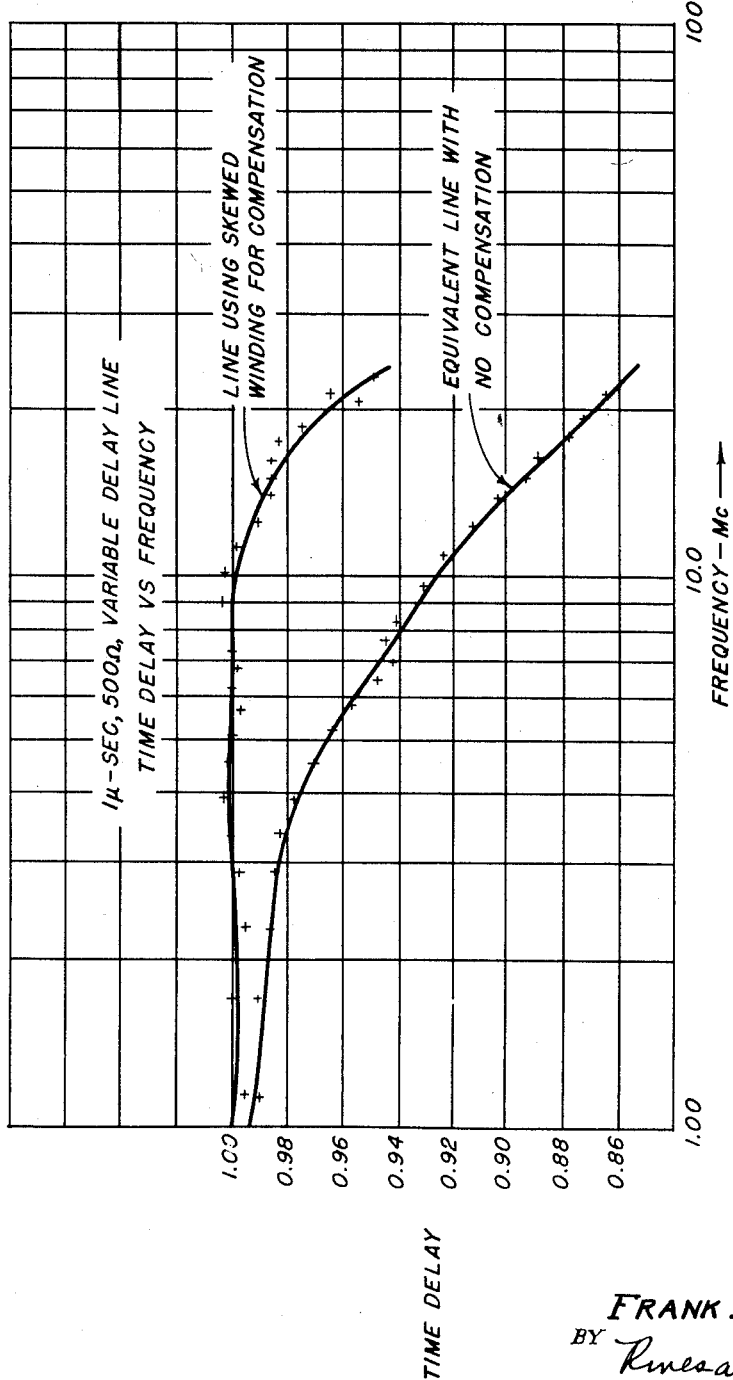

United States Patent Office 2,943,277
Patented June 28, 1960

2,943,277
APPARATUS FOR PRODUCING VARIABLE TIME DELAY

Frank D. Lewis, Lexington, Mass., assignor to General Radio Company, Cambridge, Mass., a corporation of Massachusetts Filed June 18, 1956, Ser. No. 592,137

6 Claims. (Cl. 333—31)

The present invention relates to methods of and apparatus for producing variable time delay and, more particularly to electrical time-delay lines.

Many types of time-delay networks have been evolved for utilization in a variety of electric systems. Television transmission systems, for example, frequently require delay networks that provide a substantially constant time delay over all of the frequencies in the transmission band. As another illustration, in systems employing pulses, such as computers and the like, the pulse shape must be transmitted substantially unaltered, requiring a wide-band distortion-free delay line having substantially constant time delay for a wide band of frequencies. Among such prior-art networks are lumped and distributed circuit-element networks. The distributed-circuit networks, however, are subject to the disadvantage that the very time delay that the delay network is employed to produce, in turn, produces a progressive phase shift between the currents flowing in the successive turns of the inductance elements of the network at any given frequency, reducing the effective inductance of the distributed winding of the network as the frequency is increased. Such a decrease in effective inductance renders the time delay variable with increasing frequency. Attempts to compensate for such such time-delay variation with frequency have involved such expedients as adjusting the mutual inductance between sections of the network inductance on an individual coil basis, or winding coils on individual forms bearing ground-capacitance strips in distributed form and adjusting the positions of the coils, or altering the directions of sections of the coil windings and introducing interposed short-circuited turns to control mutual coupling, or employing suitably proportioned shielding enclosures to control the magnitude of the mutual inductance between sections of the delay network, or introducing additional coils connected in series with the principal coil of each network section but placed upon the winding form of the coil with which coupling is desired. All of such proposals, however, are subject to the further disadvantage that they are not adapted for the production of a continuously variable delay line, requiring, rather, the sectionalizing or critical shielding of the windings in some way to achieve a measure of the above mentioned delay compensation.

Continuously wound distributed-constant delay lines have accordingly been proposed with delay compensation effected to some extent by such expedients as utilizing floating capacitance patches and the like. The sizeable patches, however, produce a frequency-sensitive discontinuity in the time-delay versus frequency characteristic which may, however, be somewhat compensated for through the substitution for the patches of a high dielectric-constant paint or coating applied to the distributed winding. A further disadvantage with such capacitive compensation techniques, however, resides in the fact that, as the effective distributed capacitance increases to compensate for a decrease in effective inductance with frequency variation, the effective impedance of the delay line changes. It is desirable, moreover, since the problems attendant upon the use of such lines reside, principally, in the inductance, to effect compensation through operation upon the inductance, rather than by supplemental capacitive elements.

An object of the present invention, accordingly, is to provide a new and improved method of and apparatus for providing time delay that shall not be subject to the above-described disadvantages and that, to the contrary, shall provide a substantially constant time delay over a wide frequency range, while permitting continuous adjustment of the time delay. In summary, this result is achieved through skewing the turns of a continuous distributed-parameter winding at a nangle to the axis of the winding. Preferred constructional details are later more fully treated.

A further object is to provide a new and improved time-delay line or network.

An additional object is to provide a novel effective inductance-per-turn compensation of a winding through new and improved corrective mutual inductance control on a continuous or per-turn basis.

Other and further objects will be explained hereinafter and will be more particularly pointed out in the appended claims.

The invention will now be described in connection with the accompanying drawing, Fig. 1 of which is a perspective view, partly cut away to illustrate details of construction, of a preferred embodiment of the invention;

Figs. 3, 4, 6 and 7 are similar views illustrating successive steps in the forming of the winding;

Fig. 5 is a transverse section, upon a somewhat enlarged scale, taken upon the line 5—5 of Fig. 4, looking in the direction of the arrows;

Figure 15:
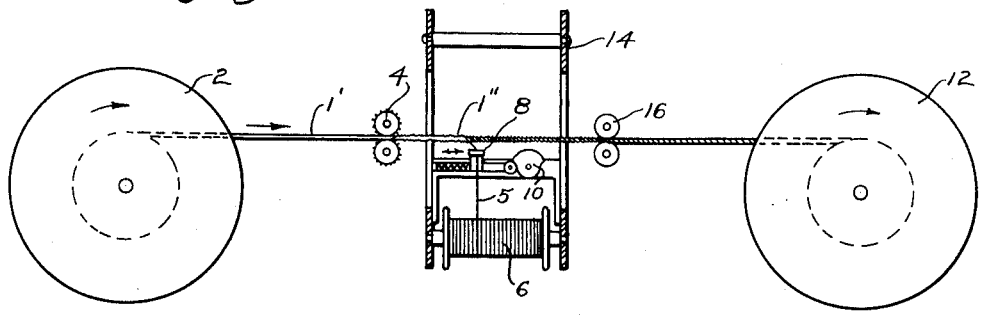
Figs. 15 and 17 are side elevations of modified apparatus for producing the skewed winding.
Figure 16:
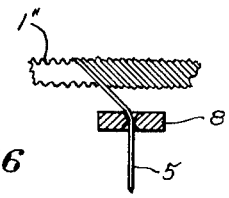
Figure 17:
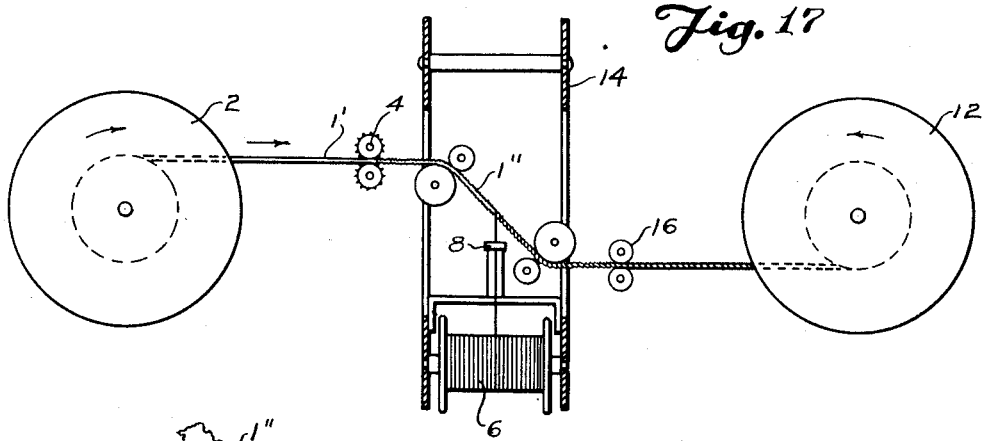
Figure 18:
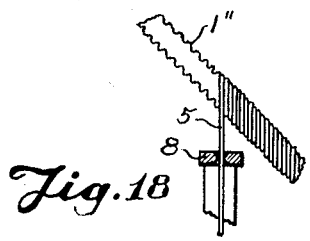
Figure 19:
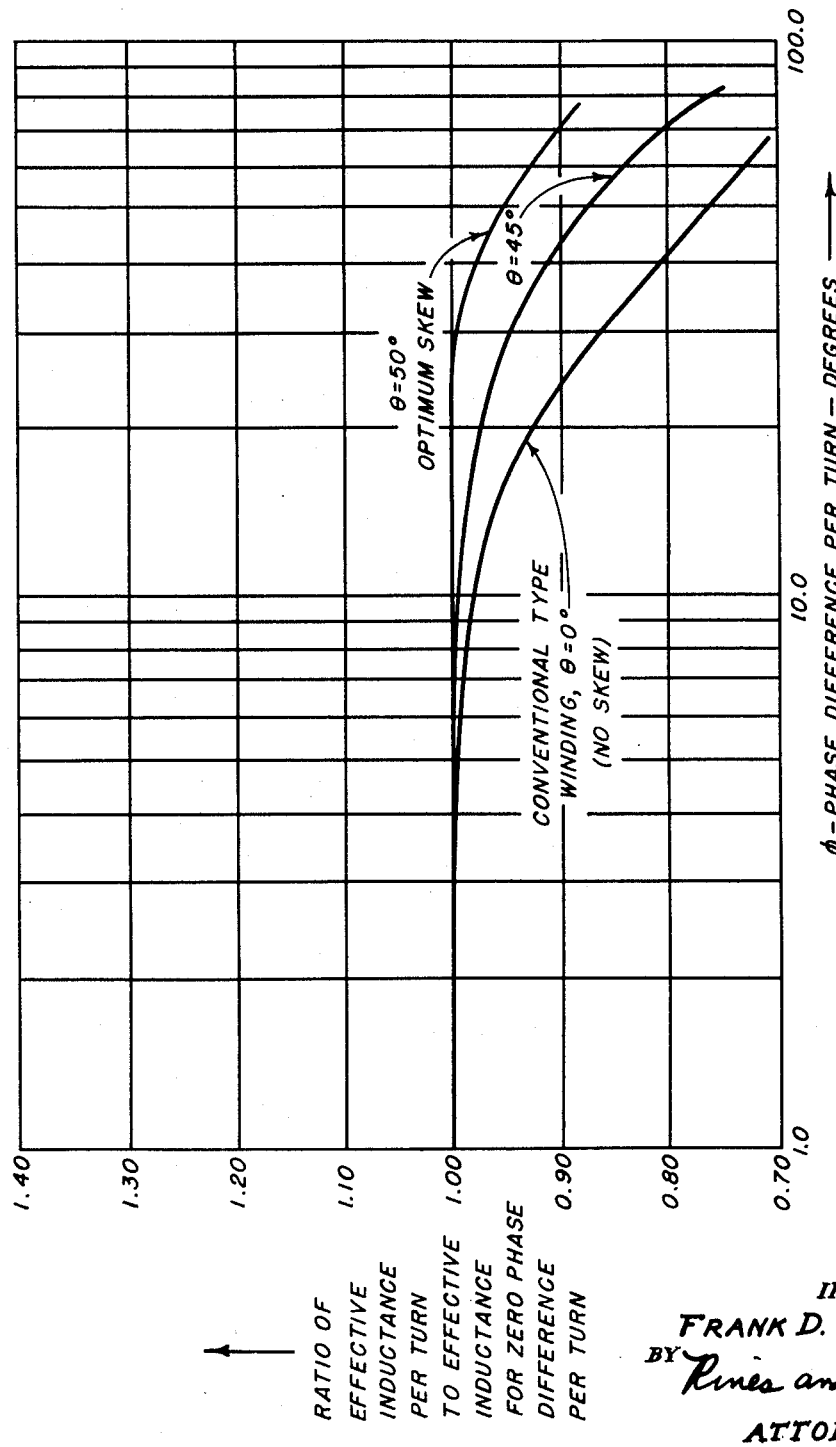

Figs. 16 and 18 are, respectively, enlarged views of details of Figs. 15 and 17; and Figs. 19 and 20 are graphs illustrating the performance of apparatus constructed in accordance with the present invention.

Figure 1:
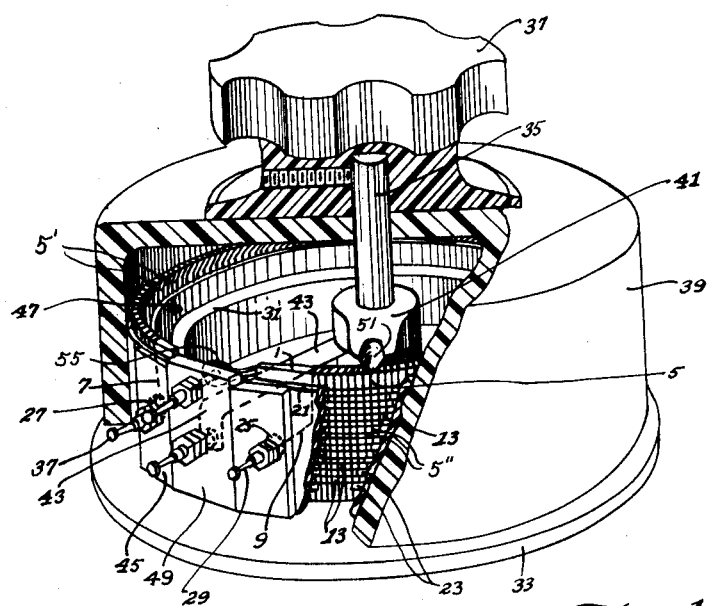

Referring to Fig. 1, a continuously variable distributed-parameter delay line is shown comprising a coil winding 5 wound transversely about an insulating flat card, strip or form 1, preferably mounted in an annular configuration about a Bakelite or other cylindrical cup-shaped base member 31, 33. One end 9 of the winding 5 is schematically shown connected to a terminal post 29, and the other end 7 is connected to an adjacent terminal post 37. A conducting slider or brush 41, mounted upon a shaft 35 that is rotatable by a knob 37, is connected by a conductive strip 43 to a further terminal post 45, intermediate the terminal posts 29 and 37 and insulated therefrom by an insulating mounting 49. The free end 51 of the slider or brush 41 rides upon a track formed by the upper adjacent portions of successive turns of the winding 5, continuously tapping off between terminal posts 29 and 45 different time-delay winding lengths in response to radial movement of the slider or brush 41 as effected by the knob 37.

Figure 2:
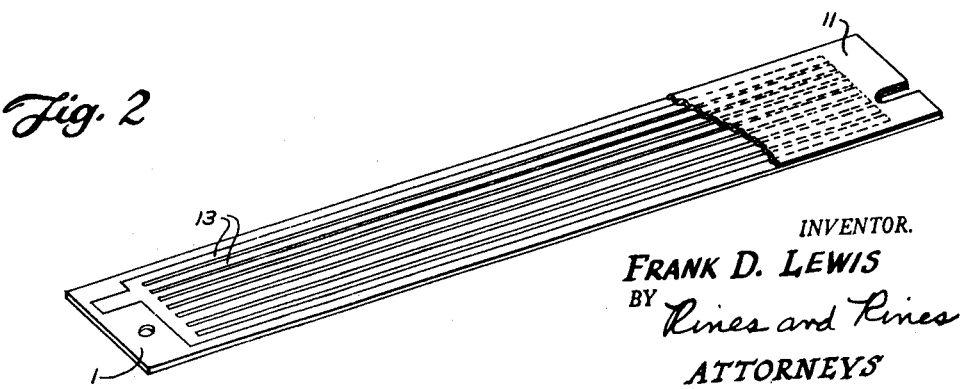
Figs. 2, 11 and 11A are similar views of capacitive strips embodied in the apparatus of Fig. 1.
Figure 7:
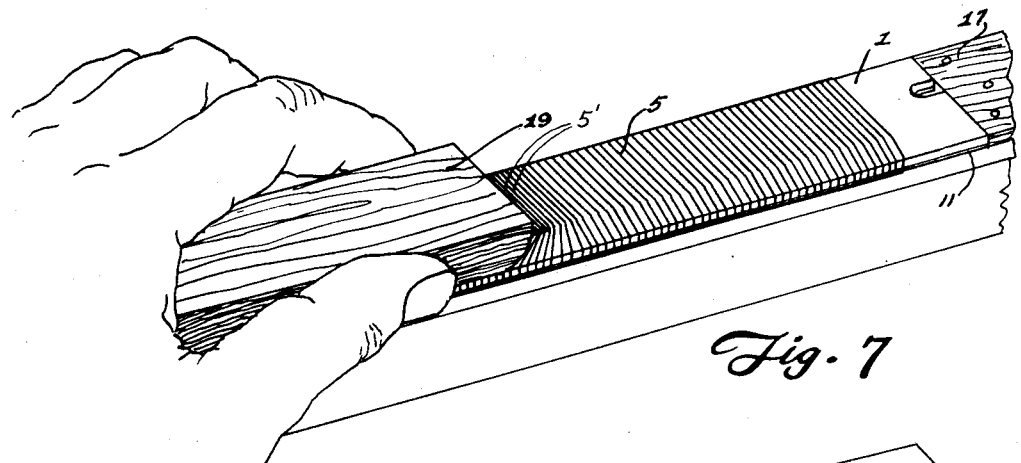
Figure 9:
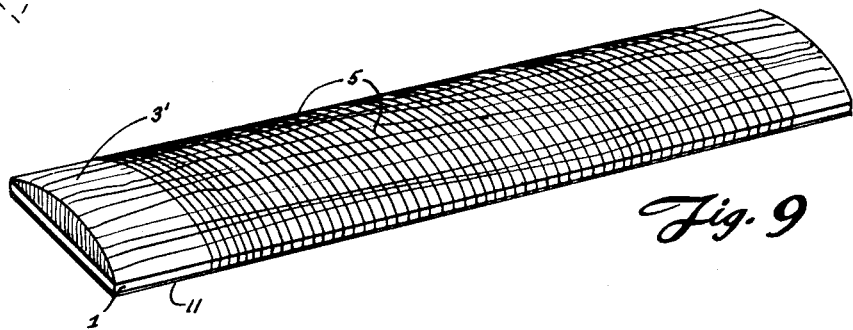
Figs. 9, 9A and 10 are views of a modified winding and skewing step, respectively.
Figure 9A:
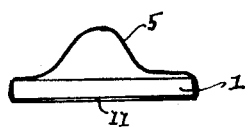
Figure 10:
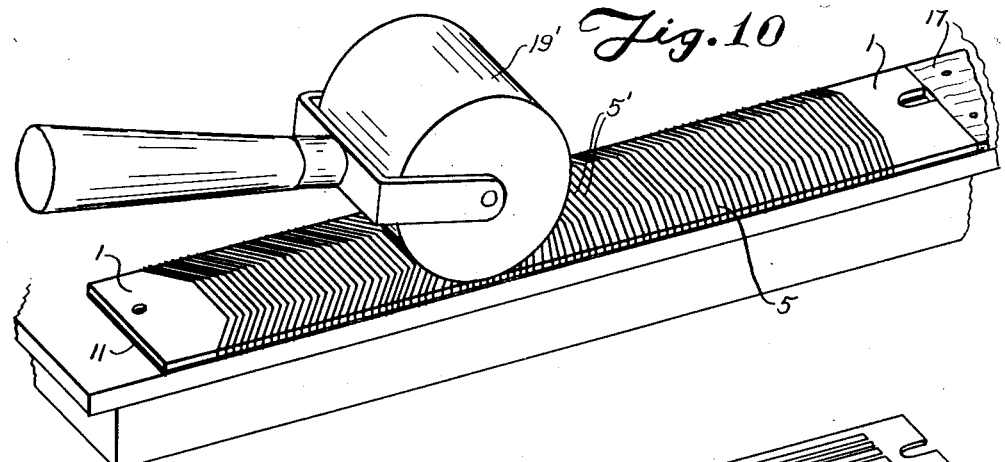

It is perhaps conducive to an easier understanding of the details of construction to consider first the assembly of the parts there involved. While automatic manufacturing techniques will later be described in connection with the embodiments of Figs. 15 to 18, it is considered simplest initially to described the construction by means of hand operations. The blank winding form 1 is shown in Fig. 2, prior to receiving the winding 5, having longitudinally extending spaced conductive strips 13, interconnected at the left-hand end. These strips 13 may be copper strips printed or etched upon the winding form 1. An insulating layer 11, as of Mylar and the like, is secured over the strips 3 to prevent direct electrical contact with the winding 5 which, as shown in Fig. 3, may be transversely wound about the form 1 with a removable block 3, Figs. 3 and 5, interposed between the side or surface of the form 1 opposite the strips 13 and the portions 5' of the winding 5. The opposite portions 5'' of the winding 5 adjacent the other side or surface of the form 1 carrying the strips 13 and the layer 11 are fixed in position by means of glue or cement 15, Fig. 4, after which the block 3 is withdrawn, Fig. 6, leaving a space between the winding portions 5' and the form 1. The perimetric length of each turn of the winding 5 is thus considerably greater than the cross-sectional perimeter of the form 1. With the form 1 resting upon a surface 17, the winding portions 5' are then pushed back and flattened out, either by a block 19, Fig. 7, or a roller 19', Fig. 10, to skew the successive turns in substantially parallel planes P, Fig. 8, the normal N to which makes an acute angle $\theta$ with respect to the winding axis O. Instead of employing a rectangular block 3, of course, spacers of other configuration, such as of the convex shape 3' of Fig. 9 or 9A, may be employed, in which event the skewed turns of the winding 5 will be of substantially D-shape instead of the somewhat trapezoidal approximation to a D-shape of Fig. 8.

Figure 11:
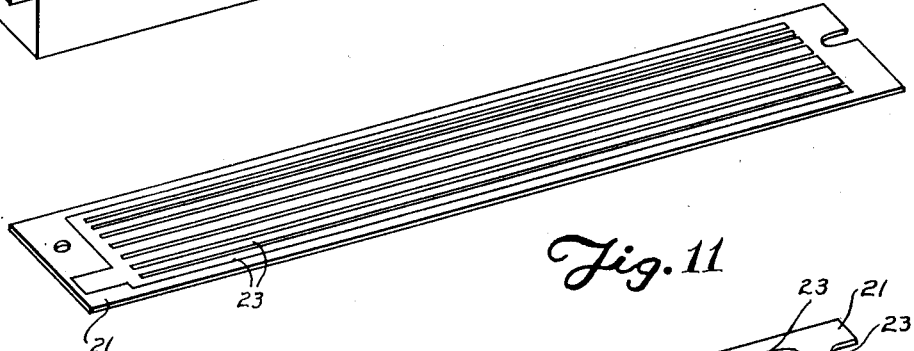
Figure 11A:
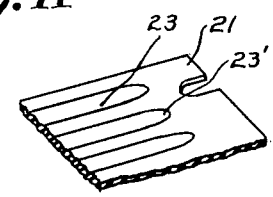
Figure 12:
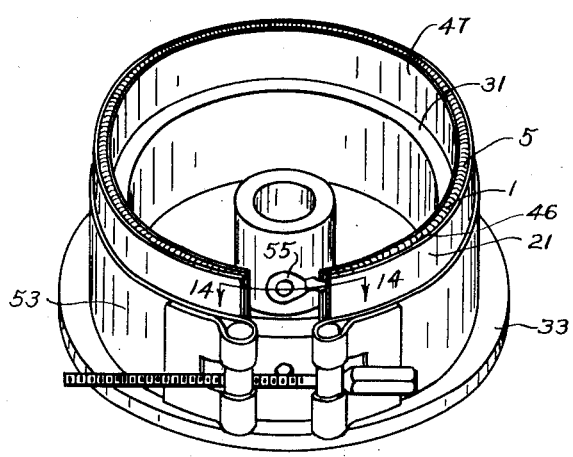
Fig. 12 is a similar view of the assembling of the parts.
Figure 13:
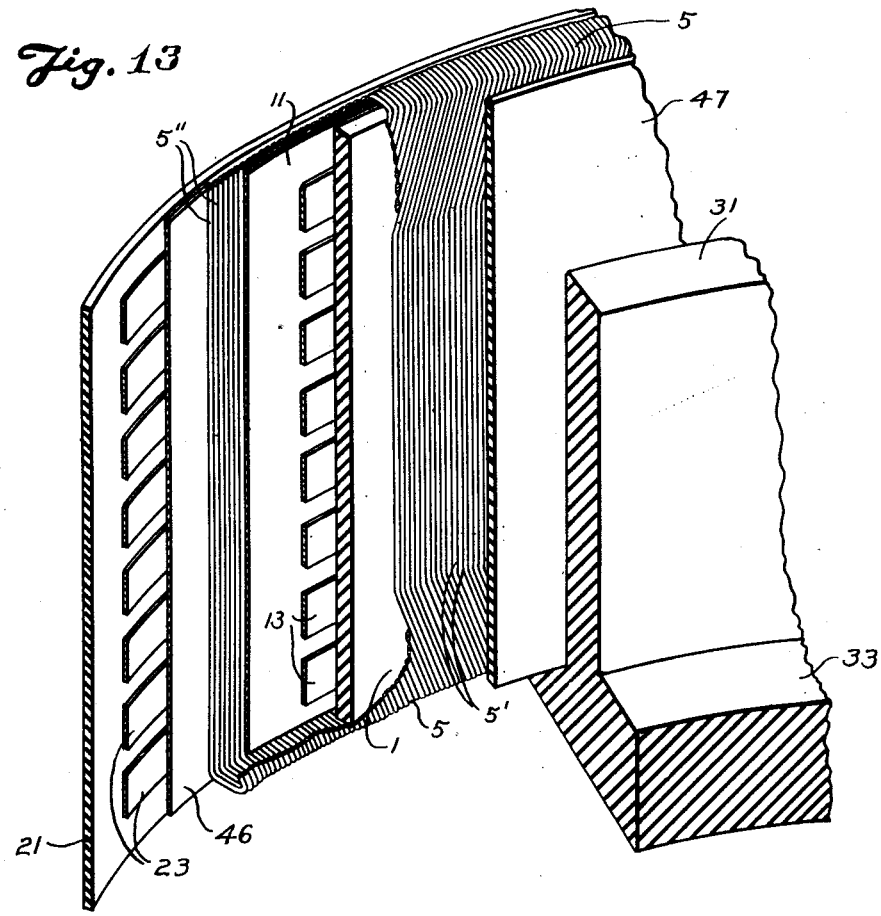
Fig. 13 is a fragmentary perspective upon an enlarged scale of the assembled parts.
Figure 14:
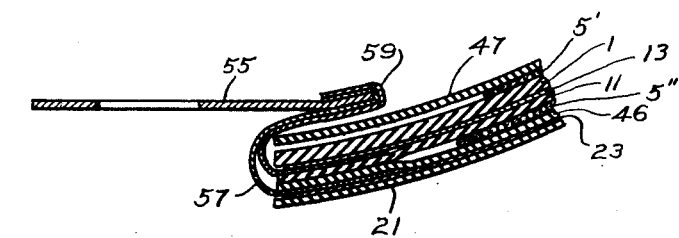
Fig. 14 is a section, upon an enlarged scale, taken upon the line 14—14 of Fig. 12, looking in the direction of the arrows.

The form 1 may then be glued or otherwise secured in place about the cylindrical wall 31 of the cup-shaped base 31, 33 with an insulating spacer 47 interposed between the winding portions 5' and the wall 31, Fig. 13. A clamp 53 is shown in Fig. 12 clamping the parts together with a further insulating strip or form 21, corresponding to the form 1, on the outside of the form 1, insulated from the winding portions 5'' by an insulating strip 46, more clearly shown in Figs. 13 and 14. The form 21, as more particularly shown in Fig. 11, carries a plurality of spaced longitudinally extending strips 23 corresponding to and capacitively cooperative with the strips 13 within the winding 5 upon the form 1. The capacitive strips 13 and 23 may be connected to a grounding or other reference-potential lug 55 and thence to a further terminal part 27, Fig. 1, by respective conductive inserts 57 and 59, Fig. 14, the strips serving to shield the delay-line winding 5. Reduction of eddy-current losses is provided by the connected comb-like strips 13, 23, as contrasted with solid grounding sheets. In order to avoid voltage dropping effects at both ends of the delay line, moreover, resulting from impedance variations brought about by an end-effect decrease in inductance and a consequent characteristic impedance decrease, both ends of the strips 13 and 23 may be tapered, as at the end 23', Fig. 11A, correspondingly to taper the capacitance at the ends and hence to maintain the characteristic impedance of the member substantially constant.

Figure 8:
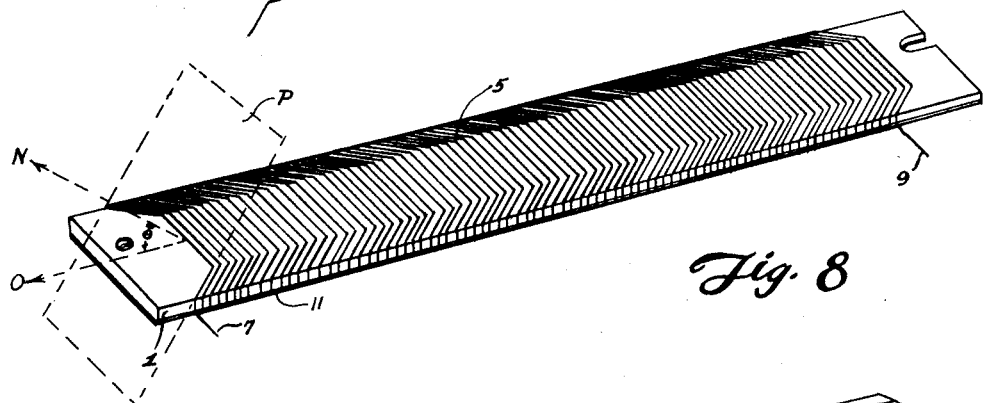
Fig. 8 is a perspective view of the completed winding.

It now remains to explain the reasons for the above construction and the novel results obtainable therewith. As previously indicated, it has been discovered that when the successive turns are skewed at an acute angle to the winding axis, the fields produced by the currents flowing in adjacent turns overlap in such a way as automatically to provide an inductance compensation effect that produces a substantially constant effective inductance over a wide frequency range. While the applicant does not desire to be bound to a particular theory to explain this phenomenon, it being sufficient to describe the invention as it has been found to operate in practice, theoretical analysis indicates that the self inductance L of a turn in the system of Fig. 1, and the mutual inductance $M_{n(n+k)}$ between the $n^{\text{th}}$ turn of the winding 5 and the $(n+k)^{\text{th}}$ turn, may be approximately determined from the following equations:

(1)
$$L = 4l\left(\log \frac{d}{\rho} + \frac{1}{4}\right) = 4l\left(\log \frac{t}{\rho \cos \theta} + \frac{1}{4}\right) \times 10^{-9} \text{ henries}$$

and (2)
$$M_{n(n+k)} = l \log \left(1 + \frac{d^4}{k^4 s^4} + \frac{2d^2}{k^2 s^2} \cos 2\theta\right) \times 10^{-9} \text{ henries}$$

$$= l \log \left(1 + \frac{t^4}{k^4 s^4 \cos^4 \theta} + \frac{2t^2 \cos 2\theta}{k^2 s^2 \cos^2 \theta}\right)$$
$$\times 10^{-9} \text{ henries}$$

where $d$ is the width of the skewed turn, $l$ is the turn length expressed in centimeters ($l$ being much larger than $d$), $\rho$ is the cross-sectional radius of the wire from which the turn is made, $t$ is the thickness of the form 1, $\theta$ is the angle of skew shown in Fig. 8, and $s$ is the turns spacing.

From the graph of Fig. 19, in which the ratio of the effective inductance per turn to the effective inductance for zero phase difference ($\phi=0$) between turns is plotted along the ordinate, as a function of the phase difference per turn $\phi$, plotted along the abscissa, it is clear that skewing the turns at an acute angle to the winding axis provides a markedly more constant inductance than is true of an ordinary coil winding $\theta=0$. In this particular group of theoretical curves, a skew angle of $\theta=50°$ is shown to produce optimum results, greater skew angles introducing increased and then decreased values of the said ratio. Worthwhile improvement is obtained, however, for skew angles substantially equal to or greater than $\theta=45°$. Equation 2 demonstrates, moreover, that the optimum skew angle for constant effective inductance is greater than $45°$.

Experimental tests, plotted in Fig. 20, demonstrate a substantially constant time delay (plotted along the ordinate) produced in accordance with the skewed line of the present invention over a wide frequency band (plotted along the abscissa) ranging from 1 to 11 megacycles, and representing a vast improvement over the varying non-constant results obtainable with an equivalent delay line not provided with the compensation of the present invention. These tests were conducted with a one microsecond, 500 ohm skewed variable delay line. Excellent pulse and step-wave form responses were produced with this line, free from overshoots and the other distorting effects of the prior-art lines. The amplitude response of equivalent unskewed lines has also been found to be poorer than that obtainable with the skewed line. Smooth variation in the amount of delay selected by the slider or brush 41 has been obtained.

Still a further useful advantage of the application of skewed turns in the manner described resides in the increase in the inductance of the skewed coil 5 wound on the form or card 1 of a given thickness with a given number of turns per unit length compared with the inductance of a similar conventional constant-pitch coil on the same form or card. This result can be used to provide an increase in time delay for a given winding length, and thus an overall decrease in size for any given performance. Alternatively, larger wire and fewer turns can be used for the same inductance, thus obtaining a higher Q and lower attenuation. The compensation method of the present invention, furthermore, offers still the additional important advantage of providing delay equalization for characteristic impedances down to 150 ohms, or lower, without introducing wavelength-sensitive discontinuities.

For the production of an improved version of the type of delay line known as delay cable, it may be desirable to use the properties of the skewed winding in the wound core of coiled center conductor of the cable for purposes of delay equalization. The manufacturing process for forming such cable may be carried out with continuously running apparatus. In Figs. 15 and 16, a continuous strip of plastic core or form material 1 is shown fed from a supply reel 2 through preferably heated notching rollers 4 that produce notches therein as at 1". A spool 6 feeds conducting wire 5 through a movable guide or fairlead member 8 that may be oscillated back and forth by a cam 10 in the horizontal direction of the arrows. The spool 6, the fairlead 8 and the cam 10 may be supported upon a carriage 14 rotatable about the core or form 1' as a center in a plane normal thereto. Skewed turns are thus provided fixed in the notches. The wound form or core 1 is then passed through heated swaging rollers 16 that lock the turns in place, after which the completed winding is received by a take-up reel 12. In the system of Figs. 17 and 18, on the other hand, the core or form 1 is carried at 1" along an incline to the vertical, and the wire is wound thereabout as the carriage 14 rotates in the vertical plane.

Further modifications will occur to those skilled in the art and all such are considered to fall within the spirit and scope of the invention as defined in the appended claims.

What is claimed is:

1. A delay line comprising a continuous winding in the form of a helix, said winding being disposed about a thin form of insulating sheet material, a corresponding first portion of each turn of the winding extending across one surface of the form around to and across the side edges thereof and lying in a first plane disposed at an angle to the axis of the winding, and a second corresponding portion of each turn of the winding extending from the side edge parts of the turn along the length of the form and across the opposite surface of the form, the second portion lying in a plane skewed with respect to the plane of the first portion in order to ensure that the second portion of each turn overlies the first portion of a subsequent turn, the amount of overlay being sufficient to produce an inductive compensation effect whereby the ratio of the effective inductance per turn to the effective inductance for zero phase difference between turns remains substantially constant over a wide range of phase differences per turn.

2. The delay line of claim 1, said second corresponding portion of each turn being skewed substantially adjacent said opposite surface of the form.

3. The delay line of claim 1, the turns of the winding being substantially D-shaped with the straight portion of the D and the immediately adjacent portions lying in said first plane and the principal loop portion of the D lying in said second plane.

4. The delay line of claim 1, further comprising cooperative capacitive elements disposed within and external to the winding and insulated therefrom.

5. The delay line of claim 4, said capacitive elements comprising strips substantially parallel to the axis of the winding, the ends of the strips being tapered.

6. The delay line of claim 1, wherein said winding is continuously wound about said form, and said form is annular and of sheet material substantially rectangular in cross-section, and further comprising electrical terminals connected to adjacent ends of the winding, one of the terminals being connected to a conductive brush riding upon a conductive track formed by adjacent predetermined portions of the successive turns.

References Cited in the file of this patent

UNITED STATES PATENTS

| 845,609 | Brown | Feb. 26, 1907 |
| 1,580,953 | Bremer | Sept. 13, 1926 |
| 1,994,534 | Robinson | Mar. 19, 1935 |
| 2,233,748 | Rust | Mar. 4, 1941 |
| 2,467,857 | Rubel et al. | Apr. 19, 1949 |
| 2,515,683 | Acosta | July 18, 1950 |
| 2,522,731 | Wheeler | Sept. 19, 1950 |
| 2,619,537 | Kihn | Nov. 25, 1952 |
| 2,704,829 | Clay | Mar. 22, 1955 |

FOREIGN PATENTS

| 733,752 | Germany | Apr. 1, 1943 |

OTHER REFERENCES

General Radio Company Catalog L, 1948, 228 pages, especially pages 39–40.

W. C. Elmore and M. Sands: "Electronics—Experimental Techniques." McGraw-Hill Book Co., Inc., New York, N.Y., page 352; 1949.